United States Patent
Sengupta et al.

(10) Patent No.: US 10,157,092 B2
(45) Date of Patent: *Dec. 18, 2018

(54) AUTOMATIC TARGETED SYSTEM SUSPENSION BASED UPON DOWNSTREAM SYSTEM FAILURE DETECTION

(71) Applicant: Oracle International Corporation, Redwood Shores, CA (US)

(72) Inventors: Aninda Sengupta, Redwood City, CA (US); Steven Gene Wolfangel, St. Louis, MO (US); Philippe Le Mouel, Seattle, WA (US); Dennis Fuglsang, Ballwin, MO (US); Lixin Tang, Glendora, CA (US); Sherry Weng, Arcadia, CA (US); Bo Stern, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 15/099,323

(22) Filed: Apr. 14, 2016

(65) Prior Publication Data
US 2016/0314032 A1 Oct. 27, 2016

Related U.S. Application Data

(60) Provisional application No. 62/153,469, filed on Apr. 27, 2015.

(51) Int. Cl.
*G06F 11/00* (2006.01)
*G06F 11/07* (2006.01)

(52) U.S. Cl.
CPC .......... *G06F 11/076* (2013.01); *G06F 11/006* (2013.01); *G06F 11/0709* (2013.01); *G06F 11/0793* (2013.01); *G06F 2201/88* (2013.01)

(58) Field of Classification Search
CPC . G06F 11/0709; G06F 11/076; G06F 11/0793
See application file for complete search history.

(56) References Cited

U.S. PATENT DOCUMENTS 6,505,310 B1 * 1/2003 Brown .................... H04L 1/242
714/43
6,735,720 B1 * 5/2004 Dunn .................. G06F 11/0745
714/43

(Continued)

OTHER PUBLICATIONS

Ben Christensen, Application Resilience in a Service-oriented Architecture, Jun. 10, 2013, pp. 1-4, http://radar.oreilly.com/2013/06/application-resilience-in-a-service-oriented-architecture.html.*

(Continued)

*Primary Examiner* — Elmira Mehrmanesh
(74) *Attorney, Agent, or Firm* — Kilpatrick Townsend & Stockton LLP

(57) ABSTRACT

Techniques described herein relate to automatic system suspension based upon downstream system failure in service-oriented architecture (SOA) applications. A system management module of a SOA system may be configured to detect a problem with a downstream service provider involved with a SOA application, and in response, automatically suspend particular processing within the application to prevent requests that may end up at the downstream service provider from entering the SOA application. The system management module may implement a circuit breaker module that maintains a circuit breaker structure specific to a downstream endpoint leading to a downstream service provider. Upon a triggering of a circuit breaker for a downstream endpoint, one or more upstream service providers are identified as associated with faulted traffic causing the triggering, and the system management module can automatically cause further traffic from these upstream service providers to be suspended.

20 Claims, 9 Drawing Sheets

(56) References Cited

U.S. PATENT DOCUMENTS

| | | | | |
|---|---|---|---|---|
| 7,925,931 | B1* | 4/2011 | Smith | G06F 11/0793 714/43 |
| 8,250,479 | B2* | 8/2012 | Anderson | G06Q 10/10 705/7.11 |
| 8,655,939 | B2* | 2/2014 | Redlich | F41H 13/00 707/602 |
| 2016/0239371 | A1* | 8/2016 | Jose | G06F 11/0793 |

OTHER PUBLICATIONS

Matt Jacobs, Hystrix, 2012, pp. 1-5, https://github.com/Netflix/Hystrix/wiki.*

Nygard, Michael T., "Release it! Design and Deploy Production-Ready Software", The Pragmatic Programmers, retrieved from http:??www.r-5.org/files/books/computers/dev-teams/production/Michael_Nygard-Desing_and_deploy_Production-Ready_Sorftware-EN.pdf, pp. 1-350, Mar. 28, 2007.

U.S. Application No. 15/099,332, received a Non-Final Office Action dated Oct. 11, 2013, 13 pages.

\* cited by examiner

AUTOMATIC TARGETED SYSTEM SUSPENSION BASED UPON DOWNSTREAM SYSTEM FAILURE DETECTION

CROSS-REFERENCE TO RELATED APPLICATIONS

The present application is a non-provisional of and claims priority to U.S. Provisional Patent Application No. 62/153,469, filed Apr. 27, 2015, entitled "AUTOMATIC TARGETED SYSTEM SUSPENSION BASED UPON DOWNSTREAM SYSTEM FAILURE DETECTION," the entire contents of which are incorporated herein by reference for all purposes.

FIELD

Embodiments of the invention relate to the field of computing systems; and more specifically, to automatic targeted system suspension based upon downstream system failure detection.

BACKGROUND

The term Service-Oriented Architecture (SOA) generally refers to a software strategy that separates functions from enterprise applications into interoperable, standards-based services, which then may be combined with other services and reused to meet particular business needs. Accordingly, by employing SOA, functionality provided by applications (from potentially multiple vendors) can be "exposed" as one or more services, and then "orchestrated" (e.g., using orchestration capabilities like Business Process Execution Language (BPEL)) into new composite applications. These composite applications may be developed to support an organization's business processes.

Service Component Architecture (SCA) is a software technology created by major software vendors, including IBM, Oracle, and TIBCO. SCA describes a model for building applications and systems using SOA principles, and further builds on open standards, such as Web services, to extend and complement existing SOA approaches.

A basic aspect of SCA is a composite, which is a unit of deployment and provides services that can be accessed remotely. A composite is made up of one or more components, each of which can be directed to performing a particular task or set of tasks. Components may offer their function as "services," and either may be used by other components within the same module (e.g., composite) or may be made available for use outside the module through entry points. Components may depend on services provided by other components—either local or remote—and these dependencies may be referred to as references. References either may be linked to services provided by other components in the same composite, or references can be linked to services provided outside the composite, which potentially can be provided by other composite. Also included within a composite are linkages between references and services, which are referred to as wires.

SOA applications can also utilize bindings (or "adapters"), which refer to the communication protocols used between modules in the system. Accordingly, one or more bindings can be assigned to a single reference, each enabling communication over a different type of protocol.

Over time, software complexity continues to rise and thus, SOA applications similarly increase in complexity. For example, an application may include many composites interacting with each other and other external systems, and each composite may include multiple components. Moreover, with the increased adoption of cloud-services, many such SOA applications may be deployed using a common set of computing resources.

With this increased complexity, it may become difficult to manage these applications. For example, when the performance of the application is negatively impacted, it can be tremendously difficult to identify which, if any, of the portions of a large SOA application are responsible for the performance degradation, and moreover, why those portions are not being performant. Further, when these performance degradations (or failures) occur, it is difficult to prevent the failures from impacting other system resources, prevent in-flight data from being lost, and efficiently recover from such system failures.

Accordingly, there is a tremendous need for better detection of, response to, and recovery from faults occurring in complex SOA systems.

BRIEF SUMMARY

The present disclosure relates generally to automatic system suspension based upon downstream system failure in service-oriented architectures.

In some embodiments, a system management module of a SOA system is configured to detect a problem with a downstream service provider involved with a SOA application, and in response, automatically prevent requests that may end up at the downstream service provider from entering the SOA application.

In some embodiments, the system management module is configured to track, for each request received from upstream services, where the request originated from and/or where the request first "entered" the SOA application (e.g., the initial component interacting with the request). For example, in some embodiments the system management module maintains metadata indicating, for a request, the particular component that first received the request.

In some embodiments, the system management module implements a circuit breaker module that maintains a circuit breaker structure specific to a downstream endpoint leading to a downstream service provider. The circuit breaker module can, in some embodiments, implement a separate circuit breaker structure for each of a plurality of downstream endpoints involved with one or more SOA applications. Each circuit breaker structure (or, "circuit breaker") can have a configured "condition" indicating a number of requests and a time duration, which together indicate the particular number of failed requests over an amount of time that will "trigger" the circuit breaker.

In some embodiments, the circuit breaker module maintains a set of fault entries (e.g., in a fault list), each associated with a "failed" request that was unable to be successfully provided to (or processed) by a downstream system. The set of fault entries may include entries for multiple downstream endpoints (i.e., for multiple downstream services), where each entry identifies a particular downstream endpoint. Thus, in some embodiments the circuit breaker module maintains a single set of fault entries for one or multiple downstream endpoints. Alternatively, in some embodiments the circuit breaker module maintains a separate set of fault entries for each downstream endpoint.

In some embodiments, each fault entry includes a timestamp (or similar time or ordering value) associated with a failure of a request, and can identify (or include data allowing for an identification) the upstream service providing the request and/or the initial component processing the request.

Thus, in some embodiments the circuit breaker module detects that a downstream service provider (associated with a circuit breaker) is unable to process the configured number of requests within the configured window of time for that circuit breaker. The requests satisfying the condition may have originated from one upstream service or multiple upstream services.

An automatic suspension module (of the system management module) can, upon the triggering of a circuit breaker associated with a downstream service, identify the one or more upstream services providing those particular failed requests (e.g., those failed requests having fault entries with timestamps within the specified time window) causing the triggering of the circuit breaker, and thus identify the one or more components in the SOA system that served as "initial" processing components for those requests. For example, in some embodiments the per-request metadata maintained by the system management module includes an identifier of the initial processing component for each request.

The automatic suspension module, in some embodiments, upon identifying the set of initial processing components, causes these components to stop processing additional requests from the associated one or more upstream services. In some embodiments, the automatic suspension module transmits a suspension message to each identified component indicating that the recipient component is to stop processing new requests.

Accordingly, in some embodiments, in response to being instructed to stop processing requests, a component may be configured to stop retrieving requests from a queue/data structure/database/etc. (e.g., requests for a SOA application inserted into the queue by an upstream service), and/or configured to deny new requests received over a network (e.g., respond to a request with a response indicating a denial), and/or configured to stop sending requests asking for additional requests from upstream service(s) (e.g., stop a "polling" process), etc. For example, a component may be configured to stop accepting new requests issued from a web service upstream service.

In some embodiments, however, the automatic suspension module may, upon the triggering of a circuit breaker associated with a downstream service, identify a component within a SOA application that is not the initial point of entry for the failed request(s) to be "shut down." For example, in some embodiments where a queue is utilized, the automatic suspension module can identify a component taking requests from the queue to be shut down, which may or may not be an "initial" component in the SOA application. For example, in some embodiments where a queue is utilized within an SOA application between two separate composites of the SOA application, the automatic suspension module may identify a component of the second composite (e.g., a component taking messages from the queue) despite the fact that a component of the first composite serves as the "initial" component providing the point-of-entry into the system for requests of the upstream service.

Accordingly, in some embodiments where the SOA application utilizes one or more queues, the automatic suspension module may be configured to identify a component taking messages from the queue that is the closest to the problematic downstream service within the SOA flow. In some embodiments utilizing web services or adapters, the automatic suspension module may be configured to identify the component at the initial entry point of the SOA application for the upstream service.

In some embodiments, instead of (or in addition to) causing a component to stop processing new requests, the automatic suspension module may be configured to transmit a message to the affected upstream service to instruct the upstream service to stop generating/providing new requests.

Some embodiments thus prevent tremendous operational overhead required when a downstream service fails or falters, as additional requests that would ultimately fail will not continue to be processed, and thus a substantial backlog (of potentially thousands or millions) of requests that cannot be processed will not accrue within the SOA system. Additionally, the reduction of this backlog and the reduction in failed requests being attempted will yield a significant reduction in processor utilization, network traffic utilization, memory/storage utilization, etc., during and after times of downstream service problems.

The foregoing, together with other features and embodiments will become more apparent upon referring to the following specification, claims, and accompanying drawings.

DETAILED DESCRIPTION

Figure 1:
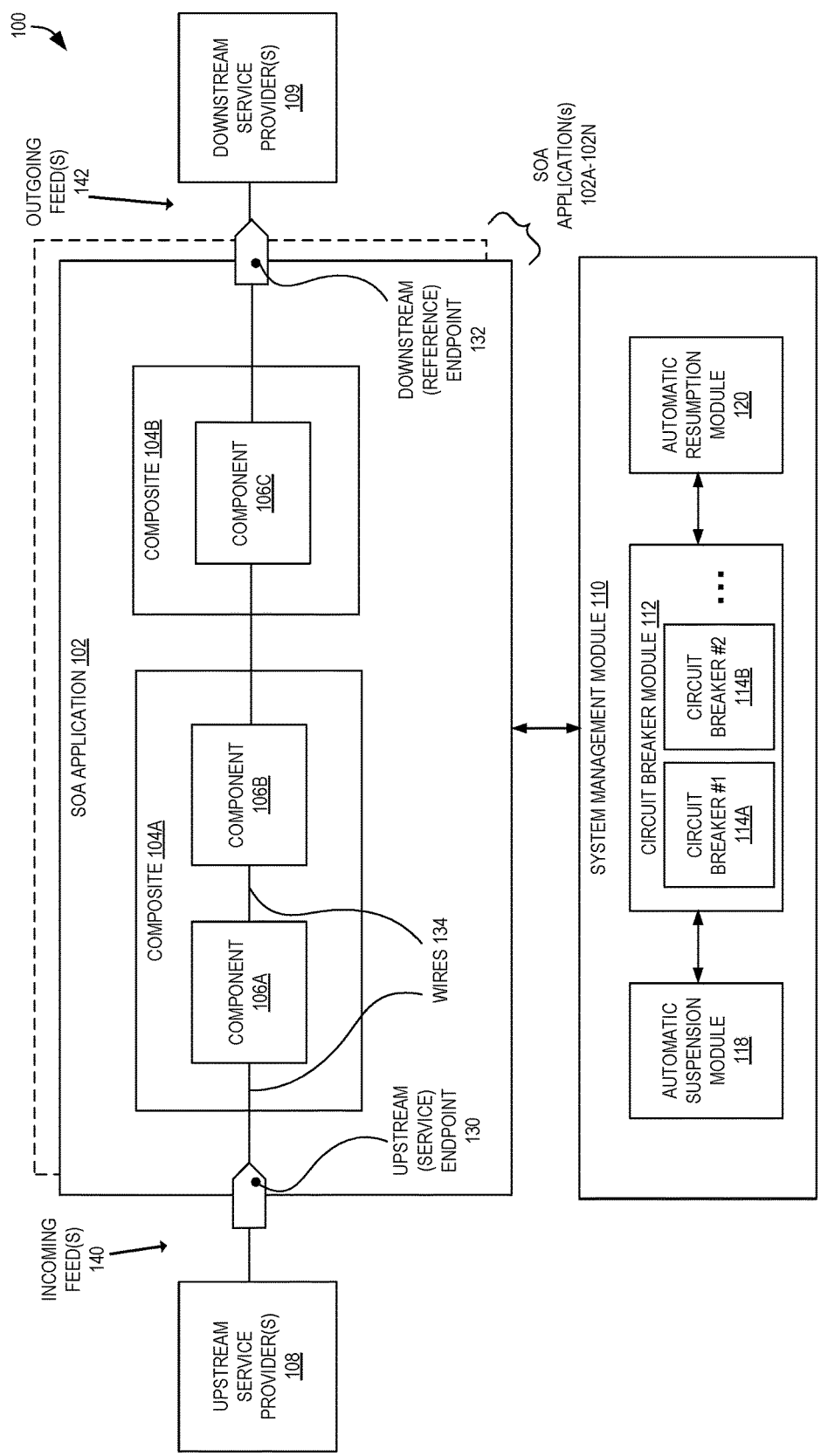
FIG. 1 illustrates a simplified high level block diagram and functional overview of a SOA system including a system management module for performing automatic system suspension based upon downstream system failures in service-oriented applications according to some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

Diagnosing and managing failures in SOA systems is tremendously difficult, as SOA systems are typically dependent on a number of factors. SOA systems pose particular challenges since large installations typically involve interactions between multiple partners and services (both internal and external), stateful and stateless components, synchronous and asynchronous communications, and/or deployment over multi-domain clusters, etc.

When a failure occurs at an upstream service, a SOA system is typically not impacted, aside from the decrease or elimination of processing occurring for requests from that particular service. Thus, the SOA system still typically has plenty of computing resources available, and can continue to process requests for other upstream services, for example.

However, when a failure occurs at a downstream service, the failure can impact both processing within the SOA system for upstream services providing requests involving that downstream service, and further for other upstream services not involving the failed downstream service. This can result because the SOA system's resources may be consumed because of the failure, as the system may incur overhead due to increased network utilization (e.g., for repeatedly attempting to communicate with a downstream service for requests), memory/storage utilization (e.g., storing requests that have not been successfully been "handed off" to the downstream service), and/or processing utilization (e.g., for attempting to contact the downstream service, continuing to process requests that will ultimately fail due to the failed downstream service, and/or attempting to manage the potentially large amount of "failed" requests that it has processed but cannot hand off). Thus, many different systems/entities can be impacted by a downstream service failure.

Accordingly, various embodiments allow for a fault of a downstream service to be quickly detected, and in response, further requests that may at some point need to utilize the downstream service may be prevented from entering the SOA system.

In some embodiments, the logic for the detection of the fault may be flexibly configured to be more aggressive (e.g., quicker, but potentially detect non-faults as faults) or passive (e.g., slower, but potentially detect fewer (or no) non-faults as faults) according to the particular needs of the environment.

In some embodiments, a system management module of a SOA system is configured to detect a problem with a downstream service provider involved with a SOA application, and in response, automatically prevent requests that may end up at the downstream service provider from entering the SOA application or entering a component/composite in the SOA application.

In some embodiments, the system management module may implements a circuit breaker module that maintains a circuit breaker data structure specific to a downstream endpoint leading to a downstream service provider. The circuit breaker module may, in some embodiments, implement a separate circuit breaker data structure for each of a plurality of downstream endpoints involved with one or more SOA applications. Each circuit breaker data structure (or, "circuit breaker") can have a configured condition that, for examples, includes a number of requests and a time duration, which together indicate the particular number of failed requests over an amount of time that will "trigger" the circuit breaker.

Thus, in some embodiments, the circuit breaker module may detect that a particular downstream service provider associated with a circuit breaker is unable to process a configured number of requests over a particular configured window of time. These requests may have originated from a single upstream services or from multiple upstream services.

In some embodiments, upon the triggering of a circuit breaker associated with a downstream service, an automatic suspension module may identify the one or more upstream services providing those particular failed requests (e.g., those failed requests having fault entries with timestamps within the specified time window) causing the triggering of the circuit breaker, and thus may identify the one more components in the SOA system that served as "initial" processing components for those requests. Alternatively, in some embodiments the automatic suspension module can directly identify the one more components in the SOA system that served as "initial" processing components for those requests.

The automatic suspension module, in some embodiments, upon identifying the set of initial processing components, causes these components to stop processing additional requests from the associated one or more upstream services. In some embodiments, the automatic suspension module transmits a suspension message to each identified component indicating that the recipient component is to stop processing new requests.

Accordingly, in some embodiments, a component may thus stop retrieving requests from a queue/data structure/database/etc. (e.g., requests for a SOA application inserted into the queue by an upstream service), may deny new requests received over a network (e.g., respond to a request with a response indicating a denial), and/or may stop sending requests asking for additional requests from upstream service(s) (e.g., stop a "polling" process), etc. In some embodiments, instead of (or in addition to) causing a component to stop processing new requests, the automatic suspension module may be configured to transmit a message to the affected upstream service(s) to instruct the upstream service(s) to stop generating/providing new requests.

Accordingly, the various embodiments described herein may prevent problems with operational overhead resulting from downstream service failures, as additional requests that would ultimately fail will not continue to be processed, and thus a substantial backlog (of potentially thousands or millions) of requests that cannot be processed will not accrue within the SOA system. Additionally, the reduction of this backlog and the reduction in failed requests being attempted will yield a significant reduction in processor utilization, network traffic utilization, memory/storage utilization, etc., during and after times of downstream service problems.

FIG. 1 illustrates a simplified high level block diagram and functional overview of a SOA system 100, including an example service-oriented application 102, and a system management module 110 configured to perform automatic system suspension, based upon downstream system failures in the service-oriented application. It should be understood that the embodiment depicted in FIG. 1 is merely one example and is not intended to unduly limit the described embodiments of the present invention. One of ordinary skill in the art would recognize many possible variations, alternatives, and modifications to this illustrated system 100. For example, there may be more or less SOA applications 102, composites 104, components 106, service endpoints 130, reference endpoints 132, upstream service providers 108, downstream service providers 109, etc.

In this example, a first SOA application 102 is depicted as including an upstream service endpoint 130 corresponding to a point from which requests may be received from other (upstream) systems, a first composite 104A that includes two components 106A and 106B, a second composite 104B that includes one component 106C, and a downstream reference endpoint 132 corresponding to a point from which a requests/responses/messages may be transmitted to other (upstream) devices or modules. Each of the composites 104 and/or components 106 may be standalone modules—possibly from different developers/originators—and/or may execute on one computing device or across many computing devices, which may be in a same geographic location or separated in one or more different geographic locations (e.g., data centers, buildings, cities, states, countries, etc.).

In certain examples, system 100 may include one or more upstream service providers 108, and one or more downstream service providers 109. A service provider (e.g., one or both of upstream service provider 108 and downstream service provider 109) may, in various embodiments, correspond to file systems, web services, message queues, databases, backend applications, and/or any other software service capable of interacting with SOA application 102.

The terms "upstream" and "downstream" as used herein may be relative terms used to refer to the relative positioning of components within the system 100, when viewed from the perspective of an SOA application 102. For example, upstream service provider 108 may be referred to as "upstream" as the upstream service provider(s) 108 provides data/instructions for SOA application 102 to process. Similarly, downstream service provider(s) 109 may be referred to as "downstream" as the SOA application 102 provides data/instructions to the downstream service provider(s) 109. Because these terms are relative, it should be understood that, for example, service provider 108 may be an downstream provider with respect to a different SOA application, and service provider 109 may be an upstream provider with respect to a different SOA, etc.

In some embodiments, the upstream service provider(s) 108 and downstream service provider(s) 109 are different components, which can be operated by different entities, possibly at different locations. However, in some embodiments, one or more of upstream service providers 108 and downstream service providers 109 can be a same component, different components of a same entity, etc. Thus, one service provider can be an upstream service provider 108 when it is acting to provide data/instructions to SOA application 102 (e.g., provide data of an incoming feed 140 to SOA application 102 at an upstream endpoint 130), and also be a downstream service provider 109 when it is acting as a recipient of data/instructions from SOA application 102.

Although not depicted herein, the SOA application 102 may include bindings (also referred to herein as "adapters") that may serve as a point of connection between components of the SOA application 102 and external systems (e.g., upstream service provider(s) 108 and/or downstream service provider(s) 109). In some embodiments, a binding may operate to receive an inbound request received according to a particular protocol/format, and translate the request into a different format (e.g., a standardized or normalized format) utilized internally by components of the SOA application 102. Similarly, a binding may operate to take messages of the SOA application 102 format and translate them into other protocols/formats for communication with other systems.

As an example, a Java Message Service (JMS) adapter may receive messages from internal SOA components and translate them into JMS-formatted messages to thereby allow components to communicate with external systems that understand JMS messages. Such abstraction allows components to interact with external systems that utilize different message protocols without requiring the components to perform any necessary work for constructing messages in any required formats.

In some embodiments, some or all of the components 106 within composite applications 104 may have one or more associated input and/or output queues for storing requests (also referred to as "messages"). As a request is received/retrieved at the application service endpoint, the request may be placed in a first input queue that is serviced by the first component 106A of the first composite 104A. When the first component 106A is able to process another request (or detects the existence of the request within the queue), the component removes the request from the queue, processes it, and then places the (possibly transformed) request into an "output" queue for that first component. This "output" queue for the first component 106A may simultaneously serve as an "input" queue for the second component 106B of the first composite, although in some embodiments the queues may be distinct. Of course, depending upon the configuration of the system, queues may be utilized at one or more of composite boundaries, component boundaries, subcomponent boundaries, at service/reference endpoints, etc.

The depicted SOA system 100 of the embodiment illustrated in FIG. 1 also includes a system management module 110, which may include an automatic suspension module 118, circuit breaker module 112, and/or automatic resumption module 120. In some embodiments, these modules are software modules executable by one or more processors of a computing device, and these modules may or may not be of a same computing device (or set of computing devices) that implement the SOA application 102.

The system management module 110, in some embodiments, may be configured to detect when a downstream service provider 109 has failed, and, in response, may selectively inhibit processing of (e.g., prevent receipt or entry of) additional traffic from incoming feeds of one or more upstream service providers 108 whose requests were involved (or affected by) the detected failure. Accordingly, system management module 110 can selectively stop the flow of failure-impacted and/or failure-causing traffic to avoid further overwhelming the failed downstream service provider(s) 109, as well as the SOA application 102 and underlying architecture. In some embodiments, this detection and selective inhibiting may continue to allow traffic of other upstream service providers 108 and/or downstream service providers 109 and/or other, non-problematic incoming/outgoing feeds to continue to be processed and not need to be, or become aware of, the failure(s). Accordingly, in some embodiments the SOA application 102 need not become burdened by dealing with potentially immense amounts of failure-impacted traffic, and may continue to interact with other upstream and/or downstream services in an uninterrupted manner.

In some embodiments, the system management module 110 may be configured to track, for each incoming request of an incoming feed 140 (e.g., from an upstream service provider 108), information associating the request with how and/or from where the incoming request was received. This information may be referred to herein as request metadata. Additionally, in certain embodiments, system management module 110 may identify and track which component (e.g., component 106A) of the SOA application 102 first (or "initially") received the request, and this information also may be stored as request metadata.

For example, in some cases, the component 106A may provide information to the system management module 110 including an identifier of the request, an identifier of the component, and/or an identifier of the SOA application 102 utilizing the component instance. This information can be recorded within a data structure, and/or may be transmitted to the system management module 110 using one or more of a variety of well-known techniques including IPC techniques, function calls, network messages, etc.

In some embodiments, system management module 110 instead may determine the request metadata without receiving any explicit signaling or action on the part of the component 106A itself. For example, in some embodiments the system management module 110 may include and/or may interacts with underlying hardware/software executing or controlling the SOA application 102 and/or component 106A, such as an infrastructure system service engine. By monitoring the underlying hardware and software executing or controlling the SOA application components 106, the system management module 110 may determine some or all of the request metadata without any communication from the application components 106. Thus, in such embodiments, the components 106 of the SOA application 102 need not be modified to self-report received message information.

The system management module 110 also may track "faulted" requests/messages that are or were unable to be passed "downstream" to a downstream service provider 109. For example, when the SOA application 102 is unable to place a message in an output queue associated with a downstream service provider 109, receives a "failure" response message from the downstream service provider 109, and/or cannot contact the downstream service provider 109 while attempting to send a message/request, etc., the system management module 110 may track this failure.

For example, in some embodiments, for each failed request/message detected, the system management module 110 may create a failure entry in a failure data structure. The failure entry may identify the particular downstream service provider 109, a time of the failure (detected, reported, or otherwise), an identifier of the upstream service provider 108 providing the request leading to the failure, and/or an identifier of a "initial" or involved component of the SOA application 102 that received the message from that upstream service provider 108.

Thus, in some embodiments the system management module 110 may determines that a particular request failed, may determine a timestamp of the failure (e.g., using a current system clock value or using a time value more explicitly associated with the failure), and may identify the providing upstream service (and/or "initial" component 106 processing the request) using, for example, the tracked request metadata. This data may be stored as a failure entry in a failure data structure maintained by the system management module 110.

In some embodiments, a single failure data structure configured to store all failure entries for all downstream service providers 109 may be maintained by the system management module 110. However, in other embodiments, data recording the failed messages/requests for a specific downstream service provider 109 may be stored in separate failure data structures which are specific to the downstream service provider 109.

For example, in some embodiments the system management module 110 may implement a circuit breaker module 112 that itself implements a circuit breaker data structure that is specific to a particular downstream service provider 109 (e.g., specific to a downstream endpoint 132). In some embodiments, each implemented circuit breaker 114A, 114B, etc., may maintain a data structure of failure/fault entries specific to the associated downstream service provider 109/downstream endpoint 132.

Each circuit breaker can be configured with a condition to evaluate the failure entries and determine when the circuit breaker should be triggered (e.g., when traffic to the corresponding downstream system 109 should be suspended). In some cases, the condition may specify a particular amount of time and a particular number of failures, and these values specify how many failures, when observed within a window of time specified by the designated amount of time, will cause the circuit breaker to be triggered.

For example, a first circuit breaker 114A may be configured with a specific amount of time (e.g., five minutes), and a specific number of failures (e.g., five faults). In such embodiments, the first circuit breaker 114A will continuously or periodically monitor the data structure of failure entries and determine whether the specified condition has been met. For example, the first circuit breaker 114A may identify whether, in the last five minutes, whether there have been five or more failures. If so, the first circuit breaker 114A will be triggered. If not, the first circuit breaker 114A will continue its monitoring operations.

Figure 2:
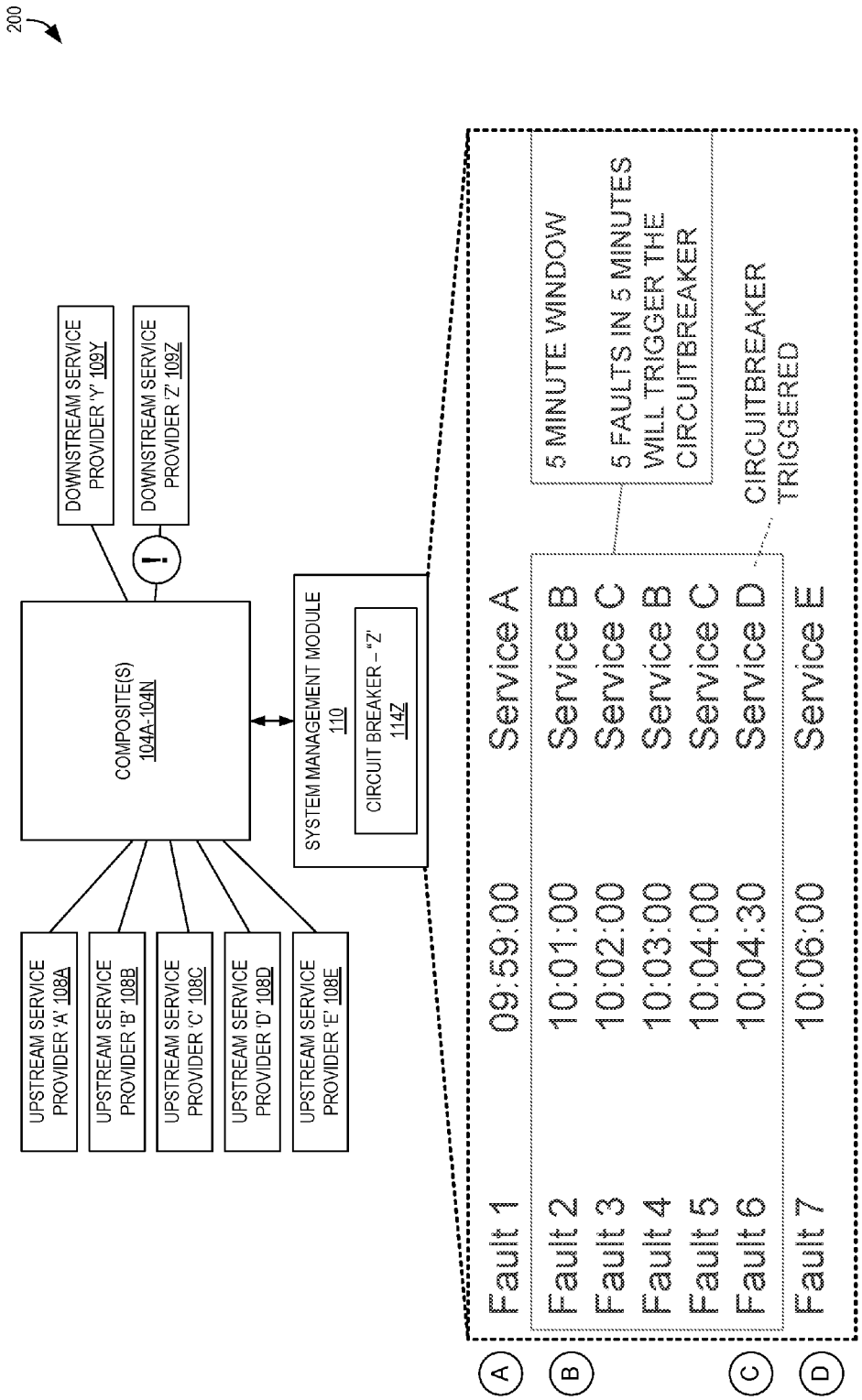
FIG. 2 illustrates exemplary fault entries leading to a triggering of a circuit breaker for automatic system suspension according to some embodiments.

An example of failure entries in a failure data structure are described with reference to FIG. 2. FIG. 2 illustrates an example set of fault entries leading to a triggering of a circuit breaker for automatic system suspension, according to certain embodiments described herein. In FIG. 2, a set of one or more composites 104A-104N are shown that receive messages/requests from five upstream service providers 108A-108E. The composites 104 in this example also publish to two downstream service providers 109Y and 109Z.

In this example, the failure data structure shown within circuit breaker "Z" 114Z shows the failures have occurred during attempts to initiate interactions with the downstream service provider 109Z, as represented by the circle including an exclamation point. Circuit breaker "Z" 114Z monitors all such failures to initiate interactions with downstream service provider 109Z. In this example, we assume that a configured condition for this circuit breaker "Z" 114Z is "5 minutes" (time) and "5 faults" (number of faults).

At circle 'A', a first fault (Fault 1) was detected and recorded as a first fault entry. Fault 1 occurred at 09:59:00, and the system management module 110 determines that the upstream service provider 'A' 108A is associated with the failed message/request (e.g., originally provided a message to the composites 104A-104N that led to the generation of the message/request that failed). This information is tracked as a failure entry. For the purpose of this discussion, we assume that no earlier faults were generated.

Of course, in various embodiments this information may not all be stored in one data structure, and some or all of this information can be determined at different times. As one example, an indicator of the associated upstream service may not be determined at the time of the fault. In some embodiments, only upon a triggering of a circuit breaker does the system management module 110 make this determination. Additionally, other information may be stored in each fault entry, such as a request identifier, etc. Thus, this figure presents a simplified view for ease of understanding.

At circle 'B', several more faults are observed with regard to downstream service provider 109Z. These faults—marked as Faults 2-5, have associated times of 10:01:00, 10:02:00, 10:03:00, and 10:04:00. These faults are also associated with upstream service provider 'B' 108B and 'C' 108C. Of note that as of this point (before Fault 6), although 5 faults have occurred (satisfying the fault amount value of the condition), these 5 faults did not happen within 5 minutes (e.g., from 9:59:00 to 10:03:59) and thus do not satisfy the specified time window part of the condition.

However, upon detection of fault 6 at circle 'C'—having a time of 10:04:30 and associated with upstream service provider 'D' 108D—the condition for circuit breaker "Z" 114Z is met, thus triggering circuit breaker "Z" 114Z.

Referring back to FIG. 1, we continue the discussion with regard to the automatic suspension module 118 of the system management module 110. In some embodiments, upon a triggering of a circuit breaker 114, the automatic suspension module 118 may detect the triggering of the circuit breaker and may automatically suspend further traffic from one or more upstream service provider(s) 108. In some embodiments, an automatic resumption module 120 may be configured to automatically resume traffic from the one or more upstream service provider(s) 108 to thus resume processing.

In some embodiments, the automatic suspension module 118 may first detect the triggering of a circuit breaker (e.g., circuit breaker 114A), and may identify one or more upstream service providers 108 to be suspended. In some embodiments, the automatic suspension module 118 may identify the one or more upstream service providers 108 that had messages fault within the configured time window of the triggered circuit breaker.

For example, turning back to FIG. 2, in some embodiments the automatic suspension module 118 may identify that failed requests associated with Service B, Service C, and Service D were within the configured time window. Accordingly, the automatic suspension module 118 determines that these three services (i.e., upstream service providers B 108B, C 108C, and D 108D) are to be suspended. Accordingly, in some embodiments, any further traffic from Service A will not yet be suspended. In other embodiments, the determination of which upstream service providers to be suspended may use a separate (e.g., longer) time window from the time window used for the circuit breaker condition. For instance, automatic suspension module 118 may determine in this case that all upstream service providers 108 that have generated traffic to the downstream service provider 109Z within a longer time window (e.g., 10 minutes, 30 minutes, etc.) may be suspended. Thus, in these embodiments, any further traffic from Service A would be suspended as well.

Continuing the example in FIG. 2, the circuit breaker "Z" 114Z may further detect another fault 7 at circle 'D' and create a fault entry. This fault may be associated with Service E (e.g., upstream service provider E 108E). The circuit breaker Z 114Z may be configured to, responsive to still being in a "triggered" state, notify the automatic suspension module 118 to suspend traffic of that service, too. However, in some embodiments the automatic suspension module 118 can be configured, upon the triggering of the circuit breaker, to monitor the set of fault entries itself, and detect when a new fault arises from a "new" upstream service provider that currently is not suspended, and cause that traffic to be suspended.

Accordingly, if Services A or E (e.g., upstream service providers 108A and 108E) were to have provided another request that would result in a failure for downstream service provider 'Z' 109Z, after the triggering of the circuit breaker (e.g., after Fault 6), then the automatic suspension module 118 may detect this failure and may cause traffic from Services A or E to be suspended.

In various embodiments, the automatic suspension module 118 may cause traffic to be suspended in a variety of different ways. In some embodiments, the automatic suspension module 118 may transmit a message or command to an identified "initial" component 106 that services requests for the particular upstream service provider(s) 108, instructing the component 106 to stop servicing requests. As a result, the component 106 may stop pulling request/message data from a queue (despite being available to do so), and/or may transmit messages (e.g., response messages to a request message) back to one or more upstream service providers 106 indicating a refusal to accept a request, etc. In some cases, the identified initial component 106 may be instructed to stop servicing requests, whereas in other cases, initial component 106 may be instructed to stop servicing only those requests the from the particular upstream service provider(s) 108 identified as those generating traffic to the downstream service provider 109Z.

Additionally or alternatively, the automatic suspension module 118 may cause an execution or support layer (providing services to or functionality for) "under" the component 106A to stop processing requests from the identified upstream service provider(s) 106. Thus, the component 106 in these embodiments might not itself directly be involved in refusing to process additional requests, and can instead in some embodiments have no visibility into the suspension.

Figure 3:
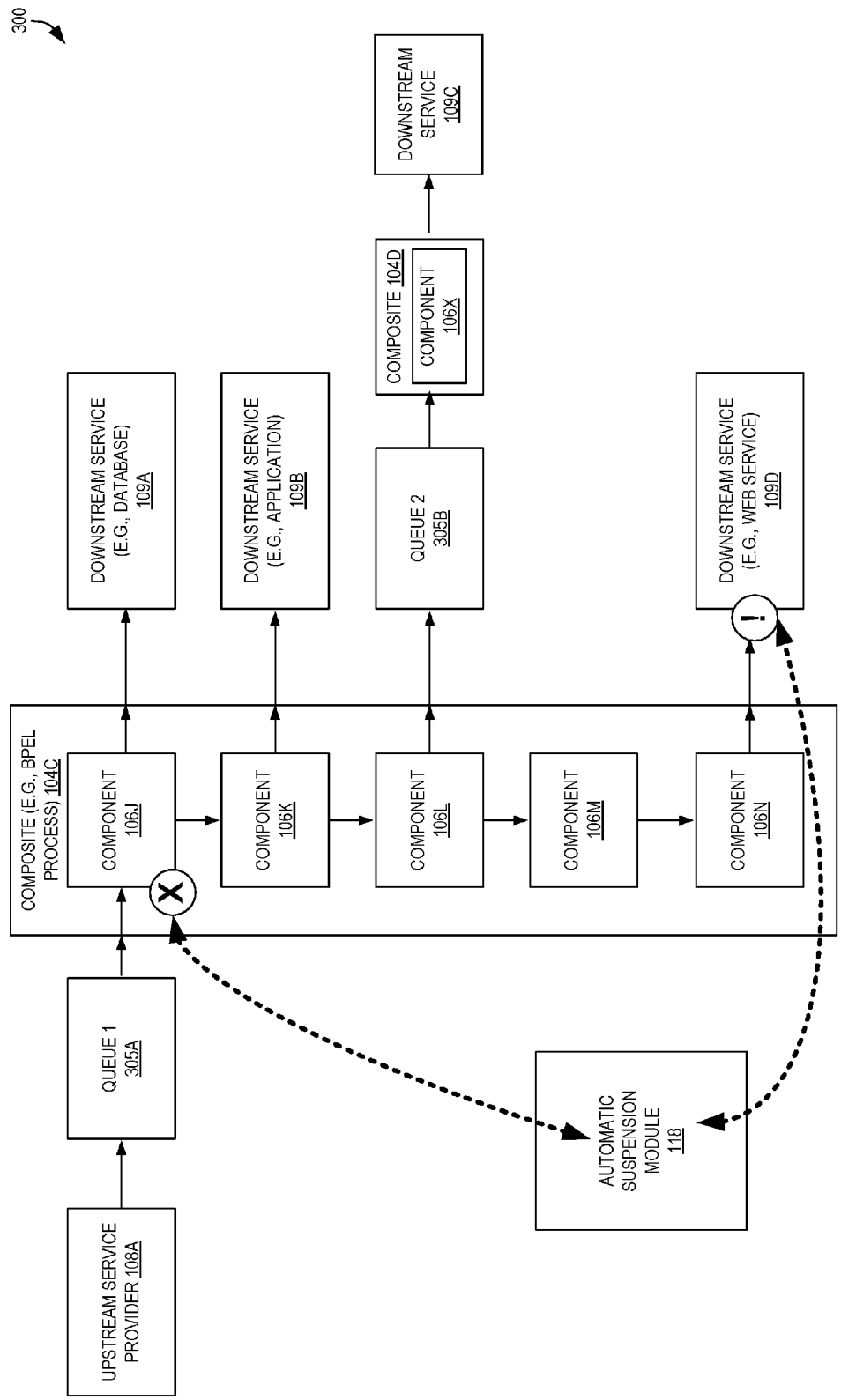
FIG. 3 illustrates a system including an exemplary SOA application and automatic suspension module detecting a downstream system fault and performing automatic system suspension according to some embodiments.

As an example, FIG. 3 illustrates a system 300 including an exemplary SOA application and automatic suspension module 118 configured to detect a downstream system fault and perform automatic system suspension, in accordance with certain embodiments.

In this embodiment, a upstream service provider (e.g., a web service) 108A may place requests in a first queue 305A, although in some embodiments the SOA application 102 may receive the requests and put them in the queue 305A. This queue 305A may be read by a first component 106J of a composite 104C (e.g., a Business Process Execution Language or BPEL process), and thus serve as an "initial" point of entry into the composite 104C for upstream service provider 106A traffic.

The composite 104C may be configured to process traffic from upstream service provider 106A by performing a series of operations. In some embodiments, as the request "flows" through, it may or may not be modified at any step.

In the illustration, the component 106J processes the request and potentially may interact with a downstream system 109A (e.g., by storing and/or retrieving data in a database). Next, the request (again, possibly modified) may be passed to component 106K, which may process the request and may potentially interact with another downstream system 109B (e.g., by transmitting the request to an application). Next, the request may be passed to component 106L, which may place data in a queue 305B, which may be accessed and read from (e.g., asynchronously) by a second composite 104D, which itself may interact with a downstream service 109C.

Continuing this example, at some point, data for the request may be passed to component 106M, which may processes the data, and may send data to component 106N. Component 106N may process the received data and may interact with yet another downstream service 109D, for example, a downstream web service. For example, component 106N may return a response to web service 109D, send a request to web service 109D, etc.

In this depicted example, a fault (or faults) may occur between component 106N and the downstream service 109D, as indicated by the circled exclamation point. Upon detecting that a circuit breaker for downstream service 109D has been triggered, the automatic suspension module 118 may identify the upstream service provider 108A as providing data leading to the ultimate failure (perhaps with other, non-illustrated upstream service providers), and/or also may identify the initial component 106J, which will suspend the traffic from the upstream service provider 108A.

In some embodiments, the automatic suspension module 118 may transmit a command or message to the component 106J to suspend the traffic (represented by the circle with an 'X') from upstream service provider 108A. In other embodiments, the automatic suspension module 118 may cause or instruct an underlying system module (e.g., a module executing the component and/or providing services to the component) to suspend the traffic. This suspension, as illustrated, may include stopping the retrieval of the request data from queue 305A.

However, in some embodiments, the "identified" component used for suspending traffic might not be an "initial" component point of entry into an application. For example, in some embodiments where a SOA application 102 may utilize an internal queue (e.g., between a first composite and a second composite), the automatic suspension module 118 may identify a first component—immediately after a "last" queue in the SOA application 102 preceding the downstream service provider 109—and cause this component to suspend the traffic.

Figure 4:
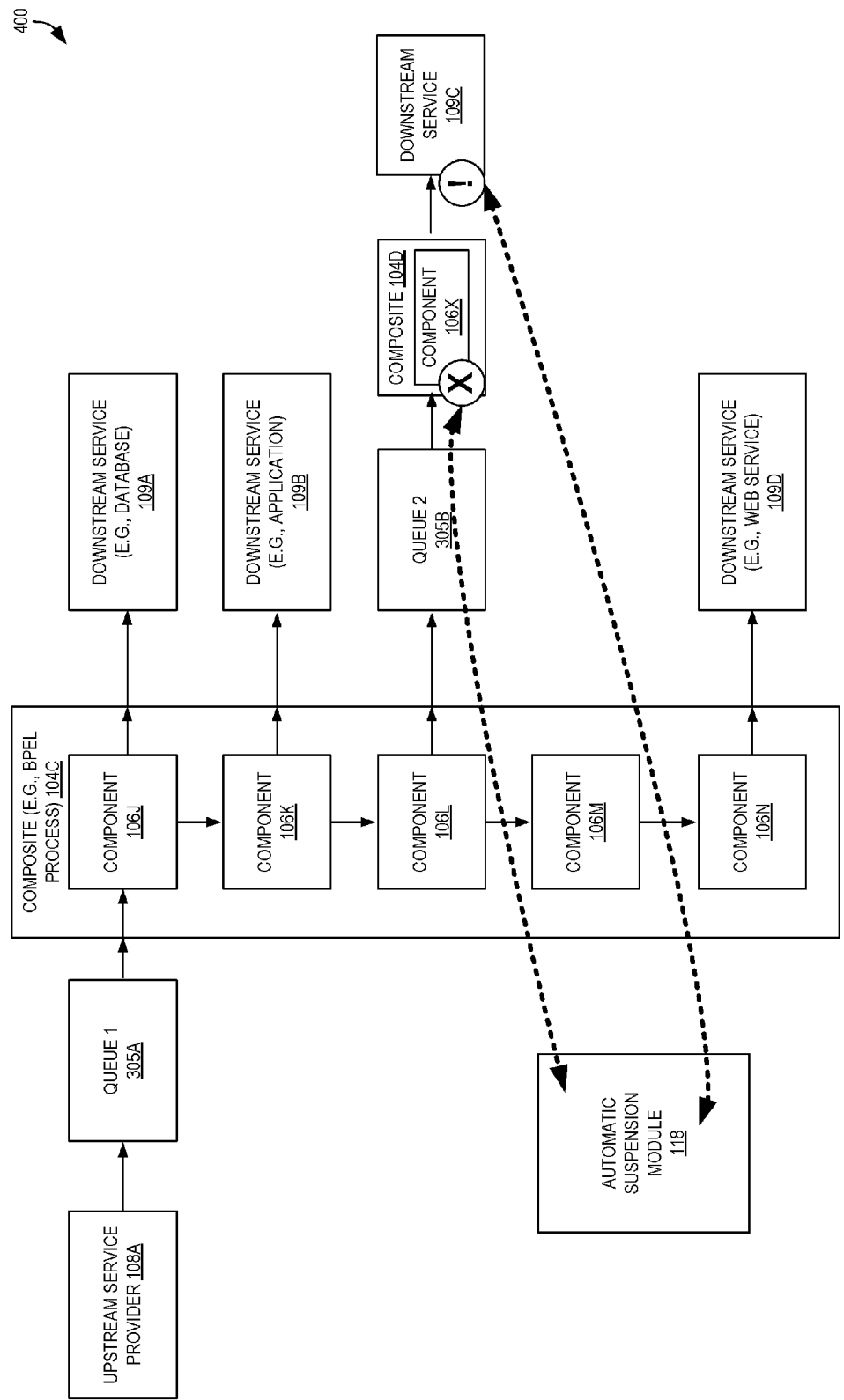
FIG. 4 illustrates a system including an exemplary SOA application and automatic suspension module detecting a downstream system fault and performing automatic system suspension according to some embodiments.

For example, FIG. 4 illustrates a system 400 including an exemplary SOA application 120 and automatic suspension module 118 configured to detect a downstream system fault and perform automatic system suspension, in accordance with to certain embodiments.

The various entities (e.g., systems, services, queues, etc.) shown in FIG. 4 are the same as those shown in FIG. 3, but in this embodiment, a fault (or faults) may occur between component 106X (of composite 104D) and the downstream service 109C, as indicated by the circled exclamation point. Upon detecting that a circuit breaker for downstream service 109C has been triggered, the automatic suspension module 118 may identify the upstream service provider 108A as providing data leading to the ultimate failure (perhaps with other, non-illustrated upstream service providers), and also may identify the component 106X as the suspension point (see circle with 'X'). As this example illustrates, in some embodiments—such as where an "internal" to a SOA application utilizes an internal queue—the automatic suspension module 118 may identify a first component (e.g., component 106X) immediately after a "last" queue (i.e., queue 305B) in the application preceding the problematic downstream service provider 109C as the suspension point. However, the automatic suspension module 118 may identify different suspension points in other examples. For instance, in other embodiments, upon detecting that a circuit breaker for downstream service 109C has been triggered, the automatic suspension module 118 may additionally or alternatively identify the first component 106J as the suspension point.

Turning back to FIG. 3, then, in some embodiments the automatic suspension module 118 may cause the traffic to be suspended at component 106J, as it is the initial entry point for the traffic into the application.

In other embodiments, the automatic suspension module 118 can instead be configured to identify and suspend traffic at component 106X, or elsewhere within the SOA application 102. For example, suspending traffic at component 106X may be effective if component 106L must await all processing to complete (with queue 305B, composite 104D, and downstream service 109C) before the processing flow may continue to component 106M. Thus, in such examples, component 106X may be instructed or caused to stop taking request data from queue 305B.

In various embodiments, the entities depicted in FIGS. 1-4 (and other entities, such as client devices, etc.) may be implemented by computing devices of various types including, but not limited to, personal computers (PCs), desktops, mobile or handheld devices such as laptops, mobile phones, tablets, etc., and other types of devices. Some or all of the entities depicted herein may utilize one or more communication networks to facilitate communications. The one or more communication networks can include networks of various types, each possibly including one or more networking devices or equipment including but not limited to network switches, routers, bridges, load balancers, etc. Examples of one or more communication networks include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), Open-Flow, IPX (Internetwork Packet Exchange), SAN (Storage Area Network) protocols, AppleTalk, Bluetooth, Long-Term Evolution (LTE), and other protocols.

Exemplary flows are now presented in accordance with some embodiments of the invention. The operations of these flows and flow diagrams are described with reference to the exemplary embodiments of the other diagrams. However, it should be understood that the operations of these flow diagrams can be performed by embodiments of the invention other than those discussed with reference to these other diagrams, and the embodiments of the invention discussed with reference these other diagrams can perform operations different than those discussed with reference to the flow diagrams. Though the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Figure 5:
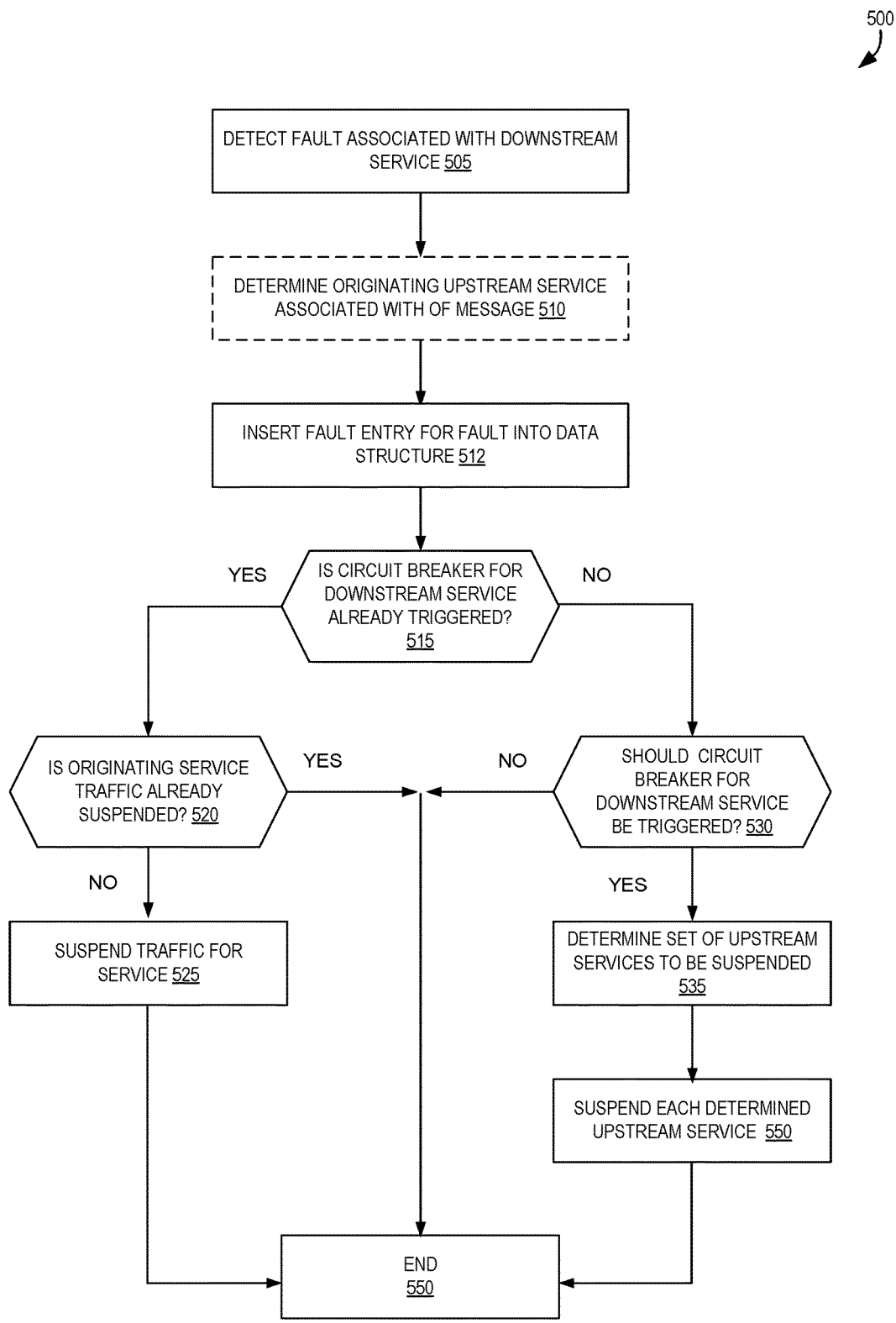
FIG. 5 illustrates an exemplary flow for performing automatic system suspension based upon downstream system failures, in accordance with one or more embodiments of the present invention.

The illustrative processes depicted in FIGS. 5 and 6 may be implemented in software (e.g., code, instructions, program) executed by one or more processing units (e.g., processor cores), hardware, or combinations thereof. The software may be stored in memory (e.g., on a memory device, on a non-transitory computer-readable storage medium, etc.). The particular series of processing steps depicted in FIG. 5 and FIG. 6 are intended to be illustrative only and non-limiting.

FIG. 5 illustrates an exemplary flow 500 for performing automatic system suspension based upon downstream system failures according to some embodiments. In certain embodiments, some or all of the process steps depicted in FIG. 5 may be performed by the system management module 110 shown in FIG. 1.

In some embodiments, flow 500 may be executed upon each determination of a fault between an application and a downstream service. At block 505, flow 500 includes detecting a fault associated with an attempt to provide a message to a downstream service.

In block 510, the system management module 110 may determine an originating upstream service associated with the message for which the fault was detected. In some embodiments, block 510 need not performed at this point in the flow 500, and in some embodiments block 510 is not performed at all. For example, instead of block 510, a block may be included for determining an initial component within the SOA application 102 from where messages from the upstream service(s) are received.

At block 512, a fault entry for the fault may be inserted into a fault data structure. As discussed above, a fault may correspond to a detection that an interaction with a downstream services (e.g., a request or message) could not be successfully provided to the downstream service provider 109. In some embodiments, the fault entry may include a time associated with the fault, a request and/or message identifier associated with the request/message that faulted, and/or may include an upstream service identifier or initial component identifier.

At decision block 515, the system management module 110 may determine whether a circuit breaker for the downstream service is already triggered. If so (515:Yes), the flow 500 may continue to decision block 520, where the system management module 110 may determine whether traffic for the originating service is already suspended. If so (520:Yes), then the flow 500 may continue to an end block 550. If not (520:No), then the flow 500 may continue to block 525, in which traffic for this service may be suspended.

When, at decision block 515, the circuit breaker for the downstream service is not already triggered (515:No), then flow 500 may continue to decision block 530, where the system management module 110 may determine whether the circuit breaker associated with the downstream service should be triggered. In some embodiments, block 530 may include determining, based upon fault entries associated with the downstream service, whether a number of fault entries, in a time window specified by a configured condition for the circuit breaker, meets or exceeds a configured number of faults of the condition.

In some embodiments, where decision block 530 results in a determination that the circuit breaker should not be triggered (530:No), flow continues to and ends at block 550.

However, in some embodiments where decision block 530 results in a determination that the circuit breaker should be triggered (530:Yes), flow 500 may continue to block 535, where a set of upstream services to be suspended is determined. In some embodiments, the upstream service associated with each message having a fault entry within the time window (i.e., those messages that collectively satisfy the circuit breaker condition) is included in the set of upstream services to be suspended. At block 550, the system management module 110 may suspend each upstream service within the set of upstream services determined at block 535, and the flow 500 may then end at block 550.

Figure 6A:
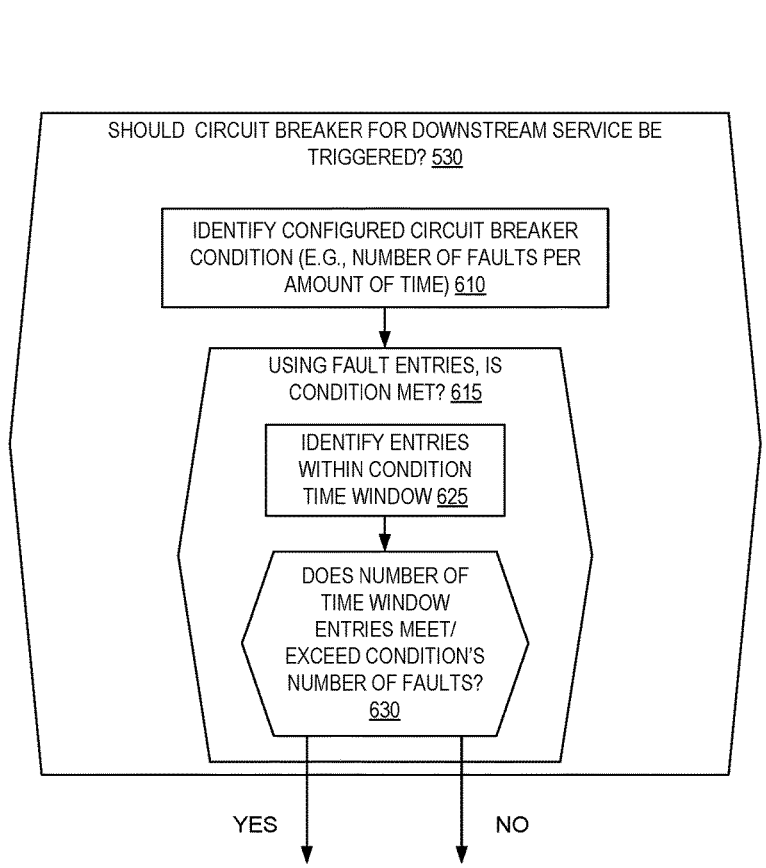
FIGS. 6A and 6B are illustrative flow diagrams showing examples of determining whether a circuit breaker for a downstream service should be triggered, and determining a set of originating services to be suspended, in accordance with one or more embodiments of the present invention.
Figure 6B:
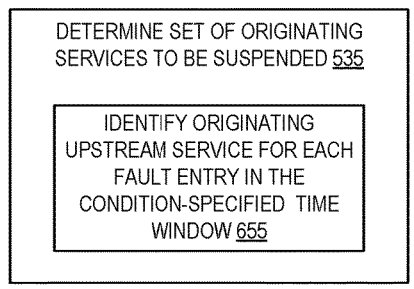

FIGS. 6A and 6B illustrative examples of determining whether a circuit breaker for a downstream service should be triggered (FIG. 6A), and determining a set of originating services to be suspended (FIG. 6B), in accordance with one or more embodiments of the present invention. In some embodiments, the processing depicted in FIGS. 6A and 6B may be performed by the system management module 110 depicted in FIG. 1.

Flow 600 depicts an example implementation of block 530 of FIG. 5, which involves determining whether a circuit breaker for a downstream service should be triggered. In some embodiments, block 530 may include identifying, at block 610, a configured circuit breaker condition. In some embodiments, the condition specifies a number of faults within an amount of time that are necessary to trigger the circuit breaker. In other examples, the condition may correspond to an increase in a total number of faults, or an increase in a rate of faults, within a predetermined time window, as compared to the number of faults or rate of faults within a previous time window of the same length. In still other examples, the condition may include determining an overall number, or a rate/percentage, of requests from particular upstream service providers (e.g., 108A) that result in faults.

In this example, flow 600 continues to decision block 615, in which, using a set of fault entries, it is determined whether the condition is met. In some embodiments, block 615 may include block 625, in which a time window specified by the condition is determined, and all entries falling within the time window are identified. In such embodiments, the time condition may correspond to a number of minutes (or seconds, hours, days, etc.), and all fault entries having an associated time (or timestamp) less than the number of minutes (or seconds, hours, days, etc.) before the current system time are identified.

At decision block 630, it is determined whether the number of fault entries identified within the window meets or exceeds the specified condition number of faults necessary to trigger the circuit breaker.

Referring now to flow 650 in FIG. 6B, this example depicts one example implementation of block 535 in FIG. 5, in which the set of originating services to be suspended is determined. In this example, block 535 may include block 655, and in which an originating upstream service for each fault entry in the condition-specified time window may be identified. In some embodiments, this includes selecting an identifier of originating upstream service from each such flow entry in the window. Additionally or alternatively, this step may include selecting a request/message identifier of each fault entry in the time window, and using a set of tracked request metadata to "lookup" the associated upstream service providers through the request/message identifiers.

Figure 7:
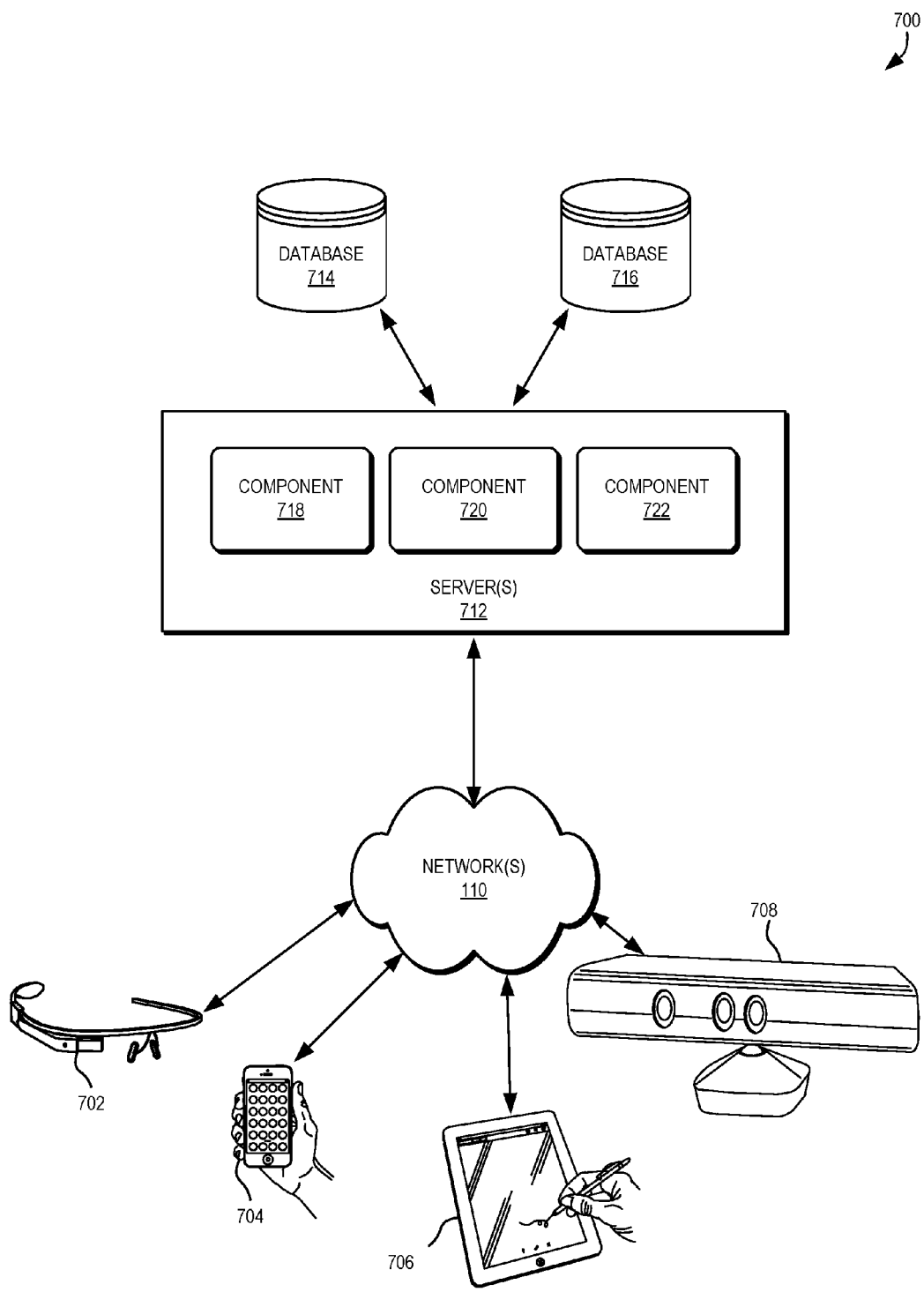
FIG. 7 illustrates a simplified diagram of a distributed system for implementing some embodiments of the present invention.

FIG. 7 illustrates a simplified diagram of a distributed system for implementing some embodiments of the present invention. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 110. Server 712 may be communicatively coupled with remote client computing devices 702, 704, 706, and 708 via network 110.

In various embodiments, server 712 may be adapted to run one or more services or software applications such as services and applications that provide SAO system processing. In certain embodiments, server 712 may also provide other services or software applications that can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720, and 722 of system 700 are shown as being implemented on server 712.

These components may include one or more of underlying SOA system backend components, the components/composites of a SOA application 102, the system management module of FIG. 1, etc.

In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

Client computing devices 702, 704, 706, and/or 708 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 700 in FIG. 7 is shown with four client computing devices, any number of client computing devices may be supported. Other devices, such as devices with sensors, etc., may interact with server 712.

Network(s) 110 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. These databases may provide a mechanism for storing information such as user interactions information, usage patterns information, adaptation rules information, and other information used by embodiments of the present invention.

For example, databases 714 and/or 716 may store tracked request metadata and/or fault entries as described herein.

As another example, databases 714 and 716 may store backend SOA data and/or store data for specific SOA applications.

Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
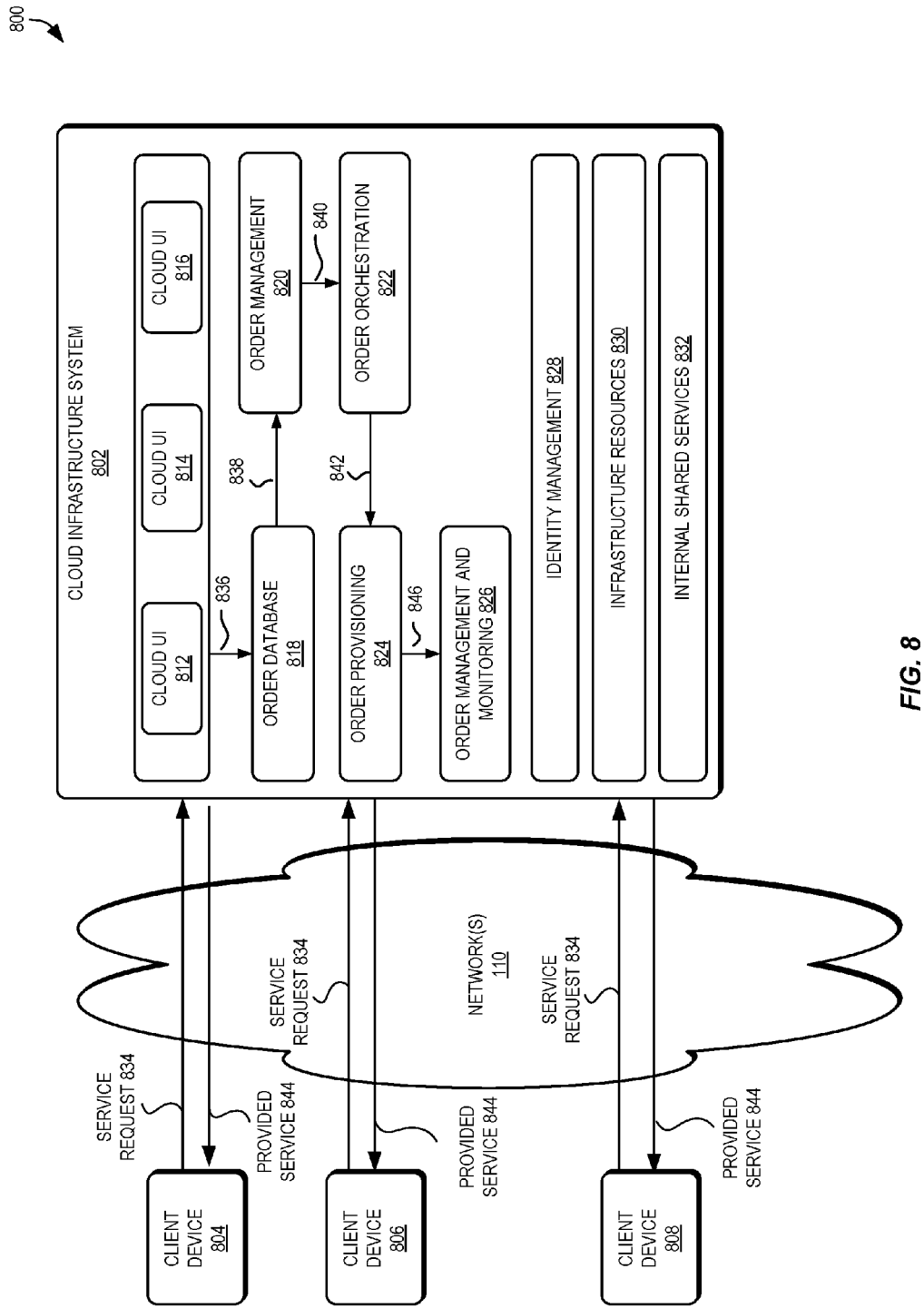
FIG. 8 is a simplified block diagram of one or more components of a system environment in which services may be offered as cloud services, in accordance with some embodiments of the present invention.

In some embodiments, the SOA system/applications may be offered as services via a cloud environment. FIG. 8 is a simplified block diagram of one or more components of a system environment 800 in which services may be offered as cloud services, in accordance with some embodiments of the present disclosure. In the illustrated embodiment in FIG. 8, system environment 800 includes one or more client computing devices 804, 806, and 808 that may be used by users to interact with a cloud infrastructure system 802 that provides cloud services. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 110 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 110.

In certain embodiments, services provided by cloud infrastructure system 802 may include a host of services that are made available to users of the cloud infrastructure system on demand. In addition to services related to providing SOA application services, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services, and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
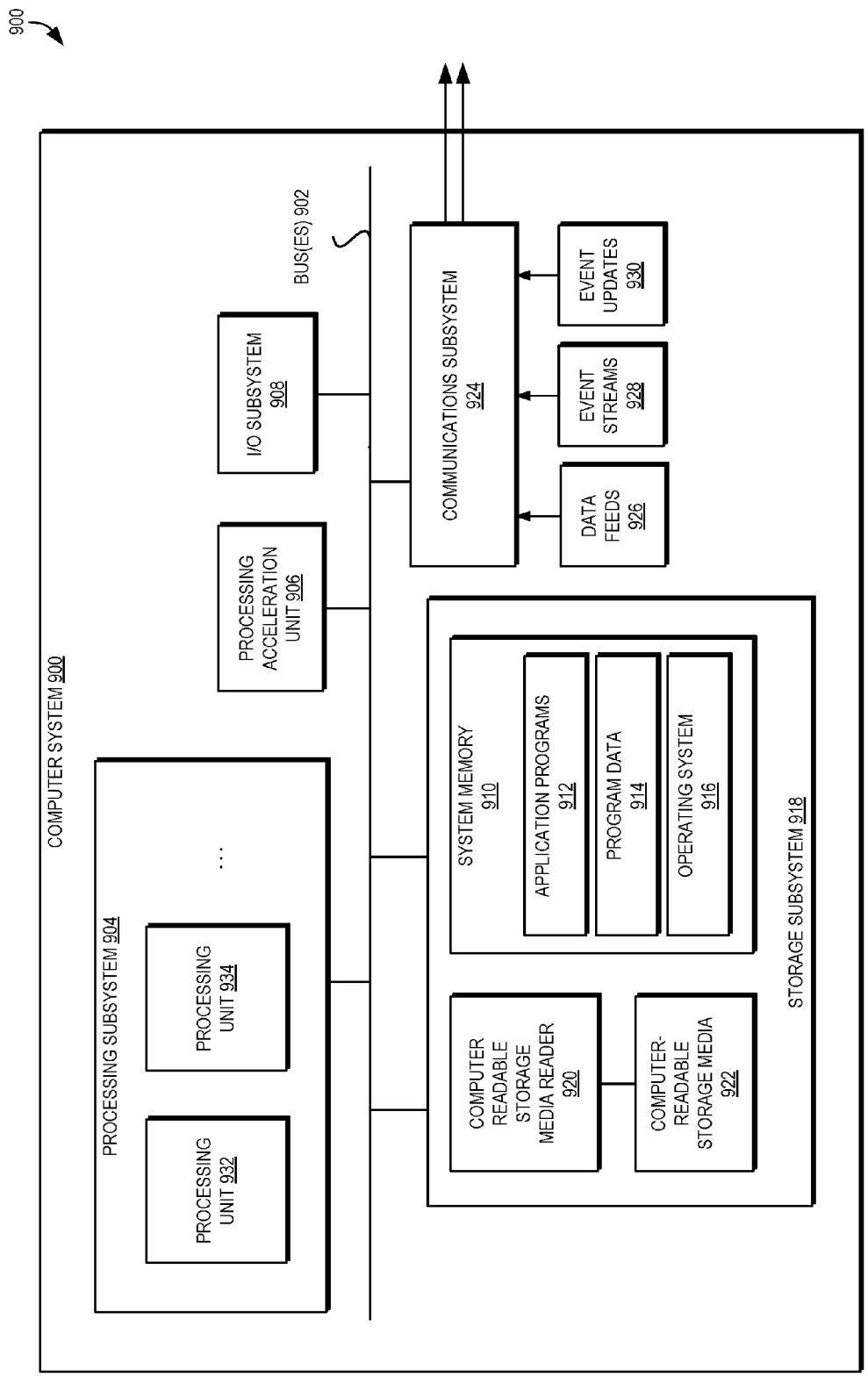
FIG. 9 illustrates an exemplary computer system that may be used to implement certain components according to some embodiments of the present invention.

FIG. 9 illustrates an exemplary computer system 900 that may be used to implement certain components according to some embodiments of the present invention. In some embodiments, computer system 900 may be used to implement any of the various servers and computer systems described above. As shown in FIG. 9, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors (GPUs), digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for providing the performance analysis and bottleneck detection in service-oriented applications.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A system, comprising:
   one or more application servers, each application server configured to:
      execute a plurality of composites of an application;
      receive and process service requests from one or more upstream service providers; and
      determine and initiate interactions with one or more downstream service providers, in response to the service requests received from the upstream service providers; and a computing device configured to execute a system management module, the computing device comprising:
   a processing unit comprising one or more processors;
   one or more network interfaces communicatively coupled with the one or more processors; and
   memory coupled with and readable by the processing unit and storing therein a set of instructions which, when executed by the processing unit, causes the computing device to:
      receive data identifying a plurality of service requests received by the application from one or more upstream service providers;
      receive data identifying a plurality of interactions initiated by the application and directed to one or more downstream service providers, wherein the plurality of interactions are initiated by the application during processing of the service requests received from the upstream service providers;
      detect one or more faults within the plurality of interactions initiated by the application and directed to a first downstream service provider;
      identify first circuit breaker conditions associated with the first downstream service provider;
      determine that the one or more faults detected within the plurality of interactions initiated by the application and directed to the first downstream service provider, satisfy the first circuit breaker conditions;
      identify at least one of the upstream service providers associated with the one or more faults; and
   cause the application to suspend processing of requests from the identified upstream service providers, wherein causing the application to suspend processing of requests comprises:
      (i) identifying one or more components of the application; and
      (ii) causing the one or more components to stop accepting requests from the identified upstream service providers, said causing comprising at least one of:
         (a) causing the one or more components to stop retrieving requests from an incoming queue associated with the identified upstream service providers, or (b) causing the one or more components to, in response to a receipt of a request message from an identified upstream service provider, transmit a response message indicating a denial of the request.

2. The system of claim 1, wherein the plurality of service requests received by the application are received from a plurality of upstream service providers, and wherein causing the application to suspend processing of requests comprises:
   causing the application to suspend processing of requests from a first subset of the plurality of upstream service providers; and
   allowing the application to continue processing requests from a second subset of the plurality of upstream service providers.

3. The system of claim 1, wherein causing the application to suspend processing of requests comprises:
   identifying one or more components of the application; and
   causing the one or more components to stop accepting requests from the identified upstream service providers; and
   wherein the identifying the one or more components of the application comprises:
      identifying, for at least one of the identified upstream service providers, a component serving as an initial processing component within the application for the upstream service provider.

4. The system of claim 3, wherein the identifying the one or more components of the application comprises:
   identifying, for at least one of the identified upstream service providers, a first component after a last queue within the application preceding a point of exit to the downstream service provider.

5. The system of claim 1, wherein determining that the first circuit breaker conditions are satisfied comprises determining whether a predetermined number of faults detected within the plurality of interactions initiated by the application and directed to the first downstream service provider have occurred within a predetermined amount of time.

6. The system of claim 1, wherein the memory of the computing device comprises further instructions which, when executed by the processing unit, causes the computing device to:
   detecting one or more additional faults within the plurality of interactions initiated by the application and directed to a second downstream service provider; and
   identifying, by the system management module, second circuit breaker conditions associated with the second downstream service provider, wherein the first circuit breaker conditions are different from the second circuit breaker conditions.

7. The system of claim 1, wherein the application comprises a service-oriented architecture (SOA) application including one or more components, and wherein the memory of the computing device comprises further instructions which, when executed by the processing unit, causes the computing device to:
   receive data from the one or more components of the SOA application, the received data including the data identifying the plurality of service requests received by the application, and the data identifying the plurality of interactions initiated by the application.

8. The system of claim 1, wherein the application comprises a service-oriented architecture (SOA) application including one or more components, and wherein the memory of the computing device comprises further instructions which, when executed by the processing unit, causes the computing device to:
   receive data from an infrastructure system service engine controlling the execution of the SOA application, the received data including the data identifying the plurality of service requests received by the application, and the data identifying the plurality of interactions initiated by the application.

9. A method, comprising:
   receiving, by a system management module executing on a computing device, data identifying a plurality of service requests received by an application from one or more upstream service providers;
   receiving, by the system management module, data identifying a plurality of interactions initiated by the application and directed to one or more downstream service providers, wherein the plurality of interactions are initiated by the application during processing of the service requests received from the upstream service providers;
   detecting, by the system management module, one or more faults within the plurality of interactions initiated by the application and directed to a first downstream service provider;

identifying, by the system management module, first circuit breaker conditions associated with the first downstream service provider;

determining, by the system management module, that the one or more faults detected within the plurality of interactions initiated by the application and directed to the first downstream service provider, satisfy the first circuit breaker conditions;

identifying, by the system management module, at least one of the upstream service providers associated with the one or more faults; and causing, by the system management module, the application to suspend processing of requests from the identified upstream service providers, wherein causing the application to suspend processing of requests comprises:
- (i) identifying one or more components of the application; and
- (ii) causing the one or more components to stop accepting requests from the identified upstream service providers, said causing comprising at least one of: (a) causing the one or more components to stop retrieving requests from an incoming queue associated with the identified upstream service providers, or (b) causing the one or more components to, in response to a receipt of a request message from an identified upstream service provider, transmit a response message indicating a denial of the request.

10. The method of claim 9, wherein the plurality of service requests received by the application are received from a plurality of upstream service providers, and wherein causing the application to suspend processing of requests comprises:
causing the application to suspend processing of requests from a first subset of the plurality of upstream service providers; and
allowing the application to continue processing requests from a second subset of the plurality of upstream service providers.

11. The method of claim 9, wherein causing the application to suspend processing of requests comprises:
identifying one or more components of the application; and
causing the one or more components to stop accepting requests from the identified upstream service providers; and
wherein the identifying the one or more components of the application comprises:
identifying, for at least one of the identified upstream service providers, a component serving as an initial processing component within the application for the upstream service provider.

12. The method of claim 11, wherein the identifying the one or more components of the application comprises:
identifying, for at least one of the identified upstream service providers, a first component after a last queue within the application preceding a point of exit to the downstream service provider.

13. The method of claim 9, wherein determining that the first circuit breaker conditions are satisfied comprises determining whether a predetermined number of faults detected within the plurality of interactions initiated by the application and directed to the first downstream service provider have occurred within a predetermined amount of time.

14. The method of claim 9, further comprising:
detecting one or more additional faults within the plurality of interactions initiated by the application and directed to a second downstream service provider; and
identifying, by the system management module, second circuit breaker conditions associated with the second downstream service provider, wherein the first circuit breaker conditions are different from the second circuit breaker conditions.

15. The method of claim 9, wherein the application comprises a service-oriented architecture (SOA) application including one or more components, the method further comprising:
receiving data from the one or more components of the SOA application, the received data including the data identifying the plurality of service requests received by the application, and the data identifying the plurality of interactions initiated by the application.

16. The method of claim 9, wherein the application comprises a service-oriented architecture (SOA) application including one or more components, the method further comprising:
receiving data from an infrastructure system service engine controlling the execution of the SOA application, the received data including the data identifying the plurality of service requests received by the application, and the data identifying the plurality of interactions initiated by the application.

17. A method, comprising:
receiving, by a system management module executing on a computing device, data identifying a plurality of service requests received by an application from one or more upstream service providers;
receiving, by the system management module, data identifying a plurality of interactions initiated by the application and directed to one or more downstream service providers, wherein the plurality of interactions are initiated by the application during processing of the service requests received from the upstream service providers;
detecting, by the system management module, one or more faults within the plurality of interactions initiated by the application and directed to a first downstream service provider;
identifying, by the system management module, first circuit breaker conditions associated with the first downstream service provider;
determining, by the system management module, that the one or more faults detected within the plurality of interactions initiated by the application and directed to the first downstream service provider, satisfy the first circuit breaker conditions;
identifying, by the system management module, at least one of the upstream service providers associated with the one or more faults; and
causing, by the system management module, the application to suspend processing of requests from the identified upstream service providers, wherein causing the application to suspend processing of requests comprises:
identifying one or more components of the application; and
causing the one or more components to stop accepting requests from the identified upstream service providers; and
wherein the identifying the one or more components of the application comprises identifying, for at least one of the identified upstream service providers, (i) a first component serving as an initial processing component within the application for the upstream service provider, and (ii) a second component after a last queue within the application preceding a point of exit to the downstream service provider.

18. The method of claim 17, wherein the plurality of service requests received by the application are received from a plurality of upstream service providers, and wherein causing the application to suspend processing of requests comprises:
   causing the application to suspend processing of requests from a first subset of the plurality of upstream service providers; and
   allowing the application to continue processing requests from a second subset of the plurality of upstream service providers.

19. The method of claim 17, wherein determining that the first circuit breaker conditions are satisfied comprises determining whether a predetermined number of faults detected within the plurality of interactions initiated by the application and directed to the first downstream service provider have occurred within a predetermined amount of time.

20. The method of claim 17, further comprising:
   detecting one or more additional faults within the plurality of interactions initiated by the application and directed to a second downstream service provider; and
   identifying, by the system management module, second circuit breaker conditions associated with the second downstream service provider, wherein the first circuit breaker conditions are different from the second circuit breaker conditions.

* * * * *